United States Patent
Balakrishnan et al.

(10) Patent No.: US 7,792,129 B2
(45) Date of Patent: Sep. 7, 2010

(54) MULTI-QUEUE PACKET PROCESSING USING PATRICIA TREE

(75) Inventors: Ganesh Balakrishnan, Morrisville, NC (US); Jorge R. Rodriguez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 11/565,668

(22) Filed: Dec. 1, 2006

(65) Prior Publication Data

US 2008/0130668 A1 Jun. 5, 2008

(51) Int. Cl.
*H04L 12/28* (2006.01)

(52) U.S. Cl. ............... 370/412; 711/100; 711/206

(58) Field of Classification Search ............... None
See application file for complete search history.

(56) References Cited

U.S. PATENT DOCUMENTS

| | | | |
|---|---|---|---|
| 6,041,053 A * | 3/2000 | Douceur et al. | 370/389 |
| 6,278,995 B1 * | 8/2001 | Hawkinson | 1/1 |
| 6,389,432 B1 | 5/2002 | Pothapragada et al. | |
| 6,795,441 B1 | 9/2004 | Widmer et al. | |
| 6,895,012 B2 | 5/2005 | Amou et al. | |
| 2003/0048785 A1 | 3/2003 | Calvignac et al. | |
| 2004/0095885 A1 * | 5/2004 | Yang | 370/235.1 |
| 2004/0125806 A1 | 7/2004 | Barzilai et al. | |
| 2004/0225736 A1 | 11/2004 | Raphael | |
| 2005/0071599 A1 | 3/2005 | Modha et al. | |
| 2005/0089054 A1 | 4/2005 | Ciancaglini et al. | |

FOREIGN PATENT DOCUMENTS

WO  2004088547 A2  10/2004

* cited by examiner

*Primary Examiner*—Robert W Wilson
(74) *Attorney, Agent, or Firm*—Cynthia Seal; Hoffman Warnick LLC (57) ABSTRACT

Aspects of the invention provide an improved solution for processing packets in a packetized communications network. For example, a next packet in a set of incoming packets placed in a plurality of queues is selected by obtaining a random/pseudo-random search key and identifying one of the plurality of queues based on the search key and a Patricia tree that includes at least one child node for each of the plurality of queues. A greedy algorithm can be used to select an alternative queue should the first selected queue be empty.

20 Claims, 5 Drawing Sheets

MULTI-QUEUE PACKET PROCESSING USING PATRICIA TREE

FIELD OF THE INVENTION

Aspects of the invention relate generally to processing packets in a packetized communications environment, and more particularly, to a solution for selecting one of a plurality of queues on which packets to be processed are stored using a Patricia tree.

BACKGROUND OF THE INVENTION

In a packetized communications environment, such as a storage system, network system, and/or the like, it is often desirable to classify incoming packets to be processed by a device into different priorities. By prioritizing packets, the device can provide a specified quality of service (QoS) for certain types of packets without including a lot of excess bandwidth. In general, QoS refers to the latency in processing a packet. In particular, certain applications are more sensitive to delays in communications than other applications. As a result, the packets communicated from these applications should be processed at a higher priority than packets from other applications.

To this extent, in a storage system, a storage controller, such as an Internet Small Computer System Interface (iSCSI) storage controller, can include a plurality of queues, each of which corresponds to a priority. In this case, incoming packets comprise requests, and can be prioritized according to the type of request (e.g., a paging request can have a higher priority than a log request). Similarly, in a network system, a switch, router, host, or the like, can include a plurality of queues corresponding to varying priorities. In this case, the incoming packets include data and real-time data packets, such as those including streaming voice or video, can be processed at a higher priority than other non-real-time data packets, such as those including electronic mail (e-mail) or other data.

In any event, incoming packets from each queue are selected for processing according to a corresponding priority for the queue. Various approaches have been proposed for selecting a queue from which to select the next packet to be processed. A significant consideration is the amount of processing required to select the queue. In particular, a substantial amount of processing will slow the performance of the device for each message, thereby adversely impacting the overall communications rate for the network.

However, some of the approaches that require little processing frequently can lead to a queue being "starved" of bandwidth. In this case, one or more packets may be abandoned or dropped due to a threshold for a queue being exceeded. Additionally, other approaches do not provide an approach that can be scaled to easily accommodate any number of queues.

In view of the foregoing, a need exists to overcome one or more of the deficiencies in the related art.

BRIEF SUMMARY OF THE INVENTION

Aspects of the invention provide an improved solution for processing packets in a packetized communications network. For example, a next packet in a set of incoming packets placed in a plurality of queues is selected by obtaining a random/pseudo-random search key and identifying one of the plurality of queues based on the search key and a Patricia tree that includes at least one child node for each of the plurality of queues. A greedy algorithm can be used to select an alternative queue should the first selected queue be empty. As a result, quality of service (QoS) can be implemented in a manner that avoids starving lower priority queues, is extensible and configurable, and/or uses relatively little hardware.

A first aspect of the invention provides a method of processing packets, the method comprising: selecting a next packet from one of a plurality of queues for storing packets, the selecting including: obtaining a search key, the search key comprising at least one of a random or a pseudo-random value; and identifying one of the plurality of queues based on the search key and a Patricia tree that includes at least one child node for each of the plurality of queues.

A second aspect of the invention provides a system for processing packets, the system comprising: a system for selecting a next packet from one of a plurality of queues for storing packets, the system including: a system for obtaining a search key, the search key comprising at least one of a random or a pseudo-random value; and a system for identifying one of the plurality of queues based on the search key and a Patricia tree that includes at least one child node for each of the plurality of queues.

A third aspect of the invention provides a computer program comprising program code stored on a computer-readable medium, which when executed, enables a computer system to implement a method of processing packets, the method comprising: selecting a next packet from one of a plurality of queues for storing packets, the selecting including: obtaining a search key, the search key comprising at least one of a random or a pseudo-random value; and identifying one of the plurality of queues based on the search key and a Patricia tree that includes at least one child node for each of the plurality of queues.

A fourth aspect of the invention provides a method of generating a system for processing packets, the method comprising: providing a computer system operable to: select a next packet from one of a plurality of queues for storing packets, the selecting including: obtaining a search key, the search key comprising at least one of a random or a pseudo-random value; and identifying one of the plurality of queues based on the search key and a Patricia tree that includes at least one child node for each of the plurality of queues.

A fifth aspect of the invention provides a business method for processing packets, the business method comprising managing a computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for processing packets in a packetized communications network. For example, a next packet in a set of incoming packets placed in a plurality of queues is selected by obtaining a random/pseudo-random search key and identifying one of the plurality of queues based on the search key and a Patricia tree that includes at least one child node for each of the plurality of queues. A greedy algorithm can be used to select an alternative queue should the first selected queue be empty. As a result, quality of service (QoS) can be implemented in a manner that avoids starving lower priority queues, is extensible and configurable, and/or uses relatively little hardware. As used herein, unless otherwise noted, the term "set" means one or more (i.e., at least one) and the phrase "any solution" means any now known or later developed solution.

Figure 1:
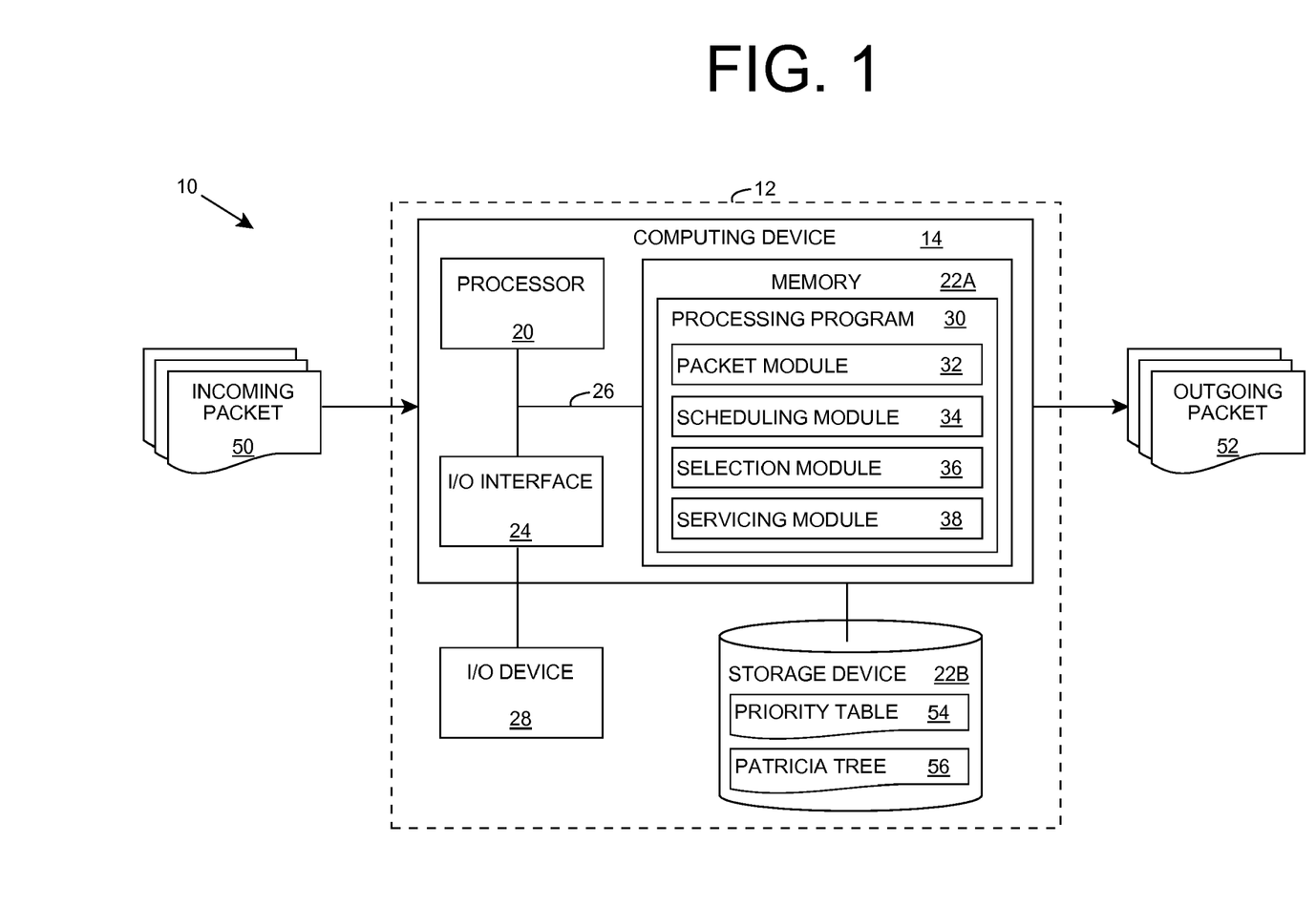
FIG. 1 shows an illustrative environment for processing packets according to an embodiment of the invention.

Turning to the drawings, FIG. 1 shows an illustrative environment 10 for processing packets according to an embodiment of the invention. To this extent, environment 10 includes a computer system 12 that can perform the process described herein in order to process incoming packets 50 and/or generate one or more outgoing packets 52 based on the processing. In particular, computer system 12 is shown including a computing device 14 that comprises a processing program 30, which makes computing device 14 operable to process incoming packets 50 by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as processing program 30, which is stored in a storage system, such as memory 22A and/or storage device 22B. While executing program code, processor 20 can read and/or write data, such as priority table 54, to/from memory 22A, storage device 22B, and/or I/O interface 24. Bus 26 provides a communications link between each of the components in computing device 14. I/O device 28 can comprise any device that transfers information between a user and computing device 14. To this extent, I/O device 28 can comprise a user I/O device to enable an individual user to interact with computing device 14 and/or a communications device to enable a system user to communicate with computing device 14 using any type of communications link.

In any event, computing device 14 can comprise any general purpose computing article of manufacture capable of executing program code installed thereon. However, it is understood that computing device 14 and processing program 30 are only representative of various possible equivalent computing devices that may perform the process described herein. To this extent, in other embodiments, the functionality provided by computing device 14 and processing program 30 can be implemented by a computing article of manufacture that includes any combination of general and/or specific purpose hardware and/or program code. For example, an embodiment of the invention implements some or all of processing program 30 in hardware. Similarly, an embodiment of the invention implements priority table 54 and/or Patricia tree 56 in hardware. Regardless, in each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, processing program 30 enables computer system 12 to process incoming packets 50, which may include generating one or more outgoing packets 52. To this extent, processing program 30 is shown including a packet module 32, a scheduling module 34, a selection module 36, and a servicing module 38. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Regardless, aspects of the invention provide a solution for processing incoming packets 50. In general, an embodiment of the invention provides a solution for prioritizing the processing of incoming packets 50 in a manner that is efficient, extensible, and avoids starving a class (e.g., a priority level) of incoming packets 50 from processing bandwidth. For example, each incoming packet 50 can be classified (e.g., assigned a priority level) placed in one of a plurality of queues, each of which corresponds to a particular classification. Subsequently, incoming packets 50 can be selected for processing from each queue with a frequency that corresponds to the classification.

Figure 2:
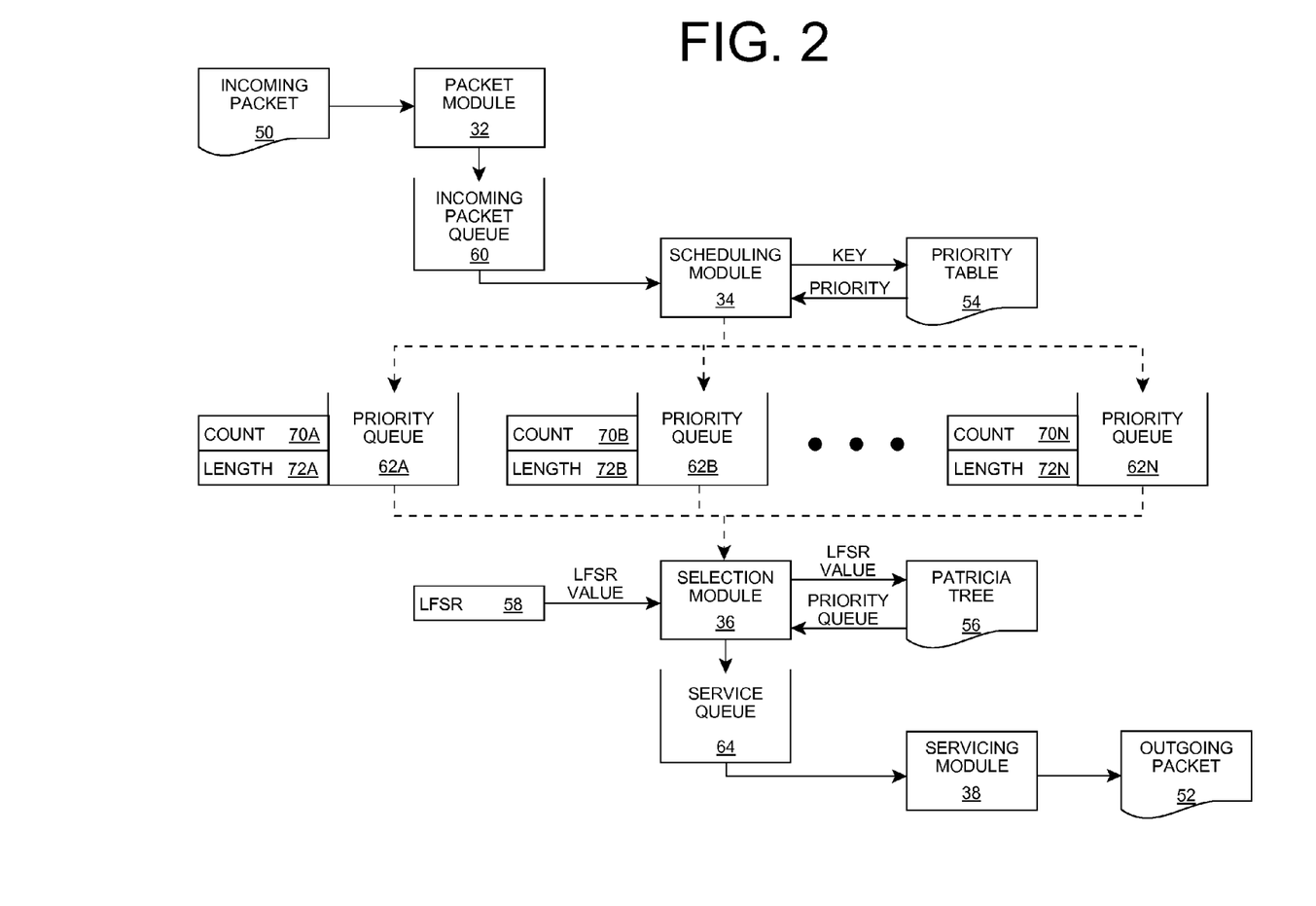
FIG. 2 shows an illustrative data flow diagram for processing incoming packets using the computer system shown in FIG. 1.

To this extent, FIG. 2 shows an illustrative data flow diagram for processing incoming packets 50 using computer system 12 (FIG. 1). Packet module 32 receives incoming packets 50 and stores (e.g., places) each incoming packet 50 in an incoming packet queue 60 for further processing. Packet module 32 can obtain incoming packets 50 using any solution. For example, incoming packets 50 may be received from one or more other computer systems 12 (FIG. 1) via a network connection, from other programs executing on computer system 12, and/or the like. Similarly, incoming packets 50 can utilize any protocol for storing data, routing the packet 50, and/or the like.

In any event, scheduling module 34 removes an incoming packet 50 from incoming packet queue 60 and stores incoming packet 50 in one of a plurality of priority queues 62A-N based on a priority of incoming packet 50. To this extent, scheduling module 34 can determine the priority of incoming packet 50 using any solution. For example, scheduling module 34 can generate a key based on incoming packet 50 and use the key to obtain a priority from a priority table 54. Scheduling module 34 can generate the key using any solution. For example, scheduling module 34 can generate the key based on the source and/or destination of incoming packet 50, a priority assigned to incoming packet 50 by the source, a combination of one or more fields in a header of incoming packet 50, a type of data being communicated by incoming packet 50, and/or the like.

Scheduling module 34 can manage priority table 54 using any solution. For example, priority table 54 can comprise a lookup table that maps a key to a corresponding priority. Scheduling module 34 can use the key to index into the lookup table and obtain the corresponding priority. Scheduling module 34 can enable a user (e.g., an individual, another system, and/or the like) to modify, add, delete, and/or the like entries in priority table 54. For example, an administrator can adjust a priority for a type of incoming packet 50 (e.g., higher/lower), add/remove entries corresponding to a type of incoming packet, and/or the like. Alternatively, priority table 54 could comprise a static lookup table, e.g., implemented in hardware to provide improved processing speed.

Selection module 36 selects a packet (e.g., a next packet) from one of the plurality of priority queues 62A-N for processing. Selection module 36 removes the selected packet from the priority queue 62A-N and places the packet on a service queue 64 for further processing. In an embodiment of the invention, selection module selects the next priority queue 62A-N using a search key and a Practical Algorithm to Retrieve Information Coded in Alphanumeric (Patricia) tree 56 (also referred to as a "trie"). Patricia tree 56 comprises a type of binary tree that includes at least one child node for each of the priority queues 62A-N. A Patricia tree 56 is well suited for applications when an actual set of search keys is sparse. In this case, a typical binary tree will result in many parent nodes having a single child node or many duplicate child nodes (e.g., multiple child nodes for the same search key).

A binary tree enables searching by performing a comparison at each parent node and then traversing to one of two child nodes of the parent node based on the comparison. This process is repeated until a child node having a target value is obtained (e.g., the child does not include any children). In a Patricia tree 56, the search paths are compressed when possible, thereby conserving memory space and expediting searching. In particular, for an internal parent node for which all children will have an identical target value, the internal parent node is changed to a child node having the target value.

Figure 4:
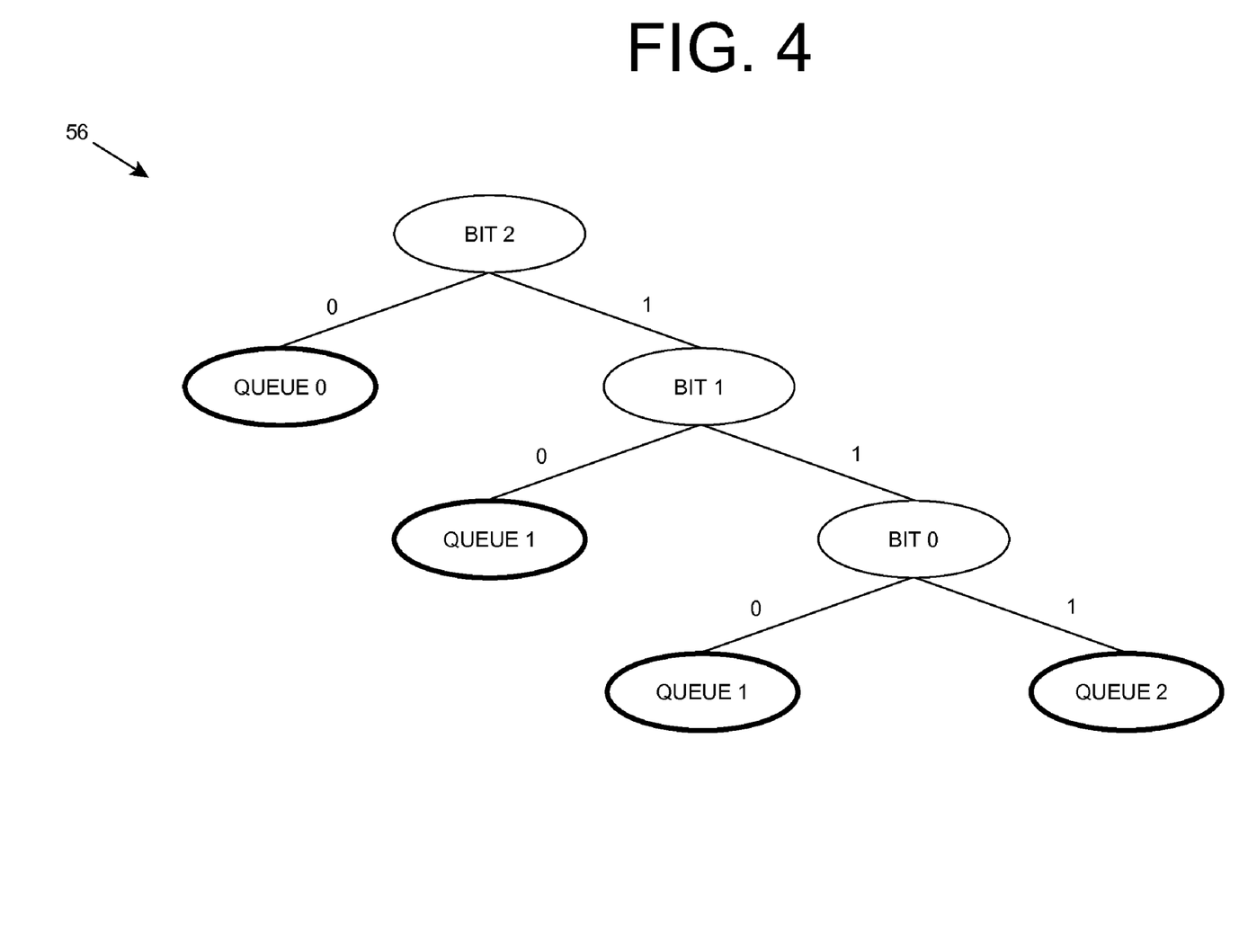
FIG. 4 shows an illustrative Patricia tree for identifying one of a plurality of queues based on three bits according to an embodiment of the invention.

For example, FIG. 4 shows an illustrative Patricia tree 56 for identifying one of a plurality of queues (e.g., QUEUEs 0-2) based on three bits (e.g., BITs 0-2) according to an embodiment of the invention. In this case, QUEUE 0 is identified for half of the values, QUEUE 1 is selected for three of the eight values, and QUEUE 2 is selected for one of the eight values. In particular, QUEUE 0 is identified any time BIT 2 has a value of zero, QUEUE 2 is selected any time all of BITs 0-2 have a value of one, and QUEUE 1 is selected for the remaining values. It is understood that Patricia tree 56 is only illustrative. To this extent, Patricia tree 56 could be used to select any number of queues using any combination values having any number of bits. Further, it is understood that the bits of the value can be compared in any order. Consequently, each of BITs 0-2 can comprise any unique position in the value, e.g., BIT 2 could comprise the least significant bit, the most significant bit, or the middle bit of a three bit value or any bit in any location of a value having more than three bits (e.g., three bits could be used from an eight bit value).

When Patricia tree 56 is searched using a series of random/pseudo-random values (e.g., search keys) having a substantially even distribution of values, the percentage that each QUEUE 0-2 is selected will correspond to the number of values for which the QUEUE 0-2 will be returned. For example, in Patricia tree 56, QUEUE 0 would be returned approximately ½ of the time, QUEUE 1 approximately ⅜ of the time, and QUEUE 2 approximately ⅛ of the time. In this manner, Patricia tree 56 can be used to implement a time division multiplexing (TDM) scheme in which each queue is regularly selected a designated portion of the time.

Returning to FIG. 2, selection module 36 can manage Patricia tree 56 using any solution. For example, selection module 36 can enable an administrator or the like to assign a weight to each priority queue 62A-N. Subsequently, selection module 36 can generate and store a Patricia tree 56 that implements the designated weights for each priority queue 62A-N. Alternatively, Patricia tree 56 can be static, e.g., implemented in hardware.

In any event, selection module 36 can identify the next priority queue 62A-N from Patricia tree 56 using a random and/or pseudo-random search key. In an embodiment of the invention, selection module 36 obtains a pseudo-random search key from a linear feedback shift register (LFSR) 58. LFSR 58 can generate a series of pseudo-random values having any number of bits. To this extent, LFSR 58 can comprise an n-bit shift register having taps, each corresponding to a bit in the pseudo-random value. LFSR 58 can produce a new value every clock tick, with the values varying between 0 and $2^n-1$ in a pseudo-random order.

Figure 3:
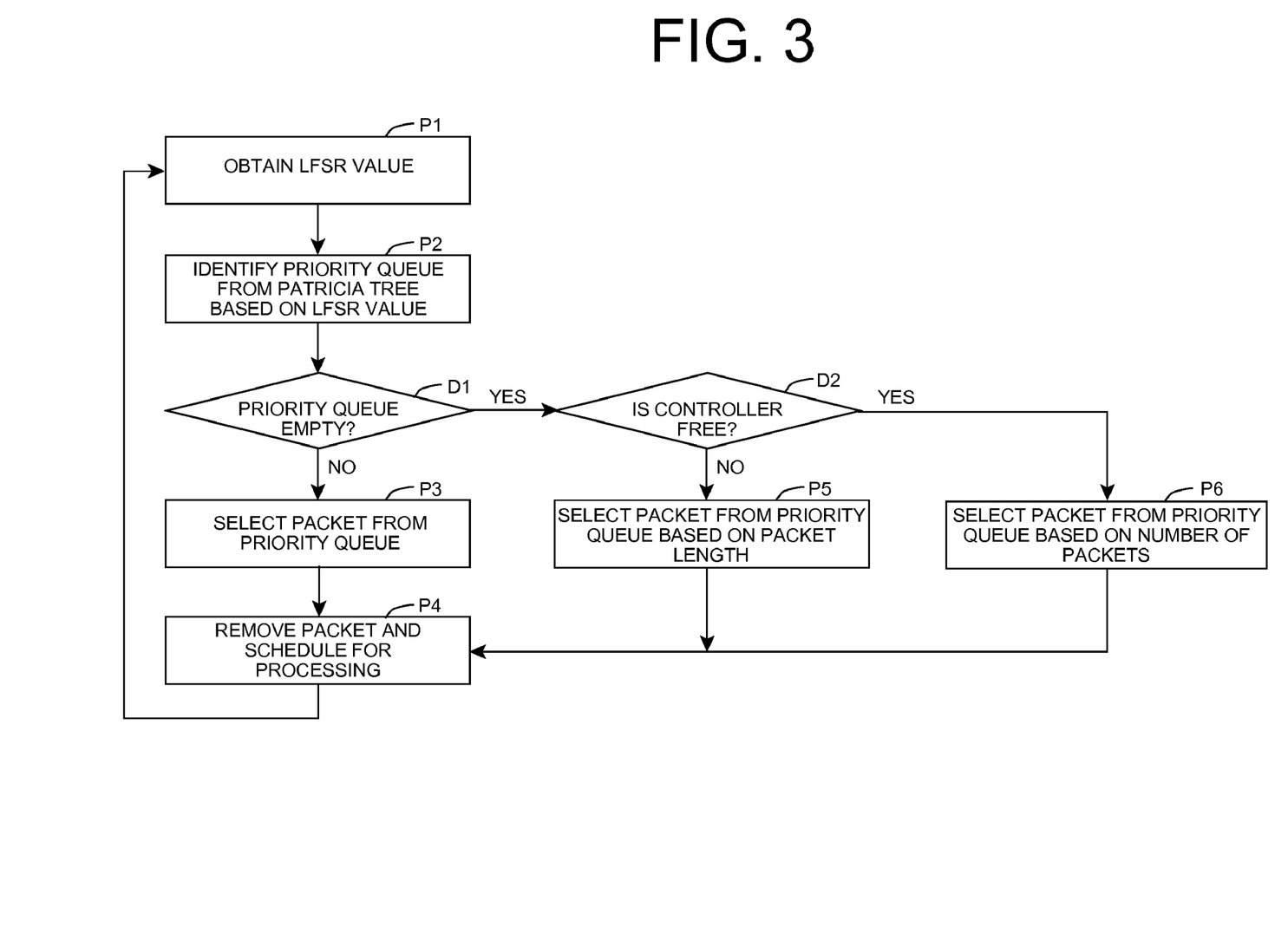
FIG. 3 shows an illustrative process for selecting packets for processing according to an embodiment of the invention.

FIG. 3 shows an illustrative process for selecting packets for processing according to an embodiment of the invention, which can be implemented by selection module 36. Referring to FIGS. 2 and 3, in process P1, selection module 36 can obtain the value of LFSR 58. In process P2, selection module 36 identifies a priority queue 62A-N from which to select the next packet based on the LFSR value. In decision D1, selection module 36 determines whether the identified priority queue 62A-N includes at least one packet or is empty. When the identified priority queue 62A-N includes at least one packet, in process P3, selection module 36 selects the next packet from the identified priority queue 62A-N and in process P4, selection module 36 removes the packet from the identified priority queue 62A-N and schedules the packet for processing. For example, selection module 36 can store (e.g., place) the packet on a service queue 64 for processing by servicing module 38.

When selection module 36 determines in decision D1 that the identified priority queue 62A-N is empty (does not include any packets), selection module 36 can identify an alternative priority queue 62A-N. For example, selection module 36 can obtain another LFSR value. However, the new LFSR value may result in the same empty priority queue 62A-N being selected again. In an embodiment of the invention, selection module 36 identifies the alternative priority queue 62A-N using a greedy selection scheme. For example, selection module 36 can identify the alternative priority queue 62A-N based on one or more properties of the priority queues 62A-N and/or one or more properties of computer system 12 (FIG. 1). To this extent, a user can designate one or more properties of priority queues 62A-N and/or computer system 12 that selection module 36 uses to identify the alternative priority queue 62A-N. Alternatively, selection module 36 can operate in an autonomous mode in which one or more properties of priority queues 62A-N is used based on one or more properties of computer system 12.

For example, computer system 12 (FIG. 1) may be processing incoming packets 50 for subsequent transmission as outgoing packets 52. In this case, a controller is used to direct the outgoing packets 52 over a set of transmission links. As a result, in decision D2, selection module 36 can determine whether a controller is available (e.g., free). When the controller is not available, in process P5, selection module 36 can identify a priority queue 62A-N based on a packet length 72A-N corresponding to each priority queue 62A-N and select a packet there from. In this manner, selection module 36 will tend to select a relatively large packet for processing to increase the use of the link while minimizing the additional burden on the controller.

However, when the controller is available, in process P6, selection module 36 can identify a priority queue 62A-N based on a number of packets, count 70A-N, corresponding to each priority queue 62A-N and select a packet there from. In this manner, selection module 36 can reduce the number of packets in a priority queue 62A-N that is most backed up. In either case, in process P4, selection module 36 removes the packet from the identified priority queue 62A-N and schedules the packet for processing as discussed herein. It is understood that use of controller bandwidth is only illustrative. For example, selection module 36 could determine a status of the link bandwidth to select the alternative priority queue 62A-N in a similar manner.

Returning to FIG. 2, processing program 30 (FIG. 1) can manage count 70A-N and length 72A-N for each priority queue 62A-N using any solution. For example, in an embodiment of the invention, scheduling module 34 recalculates count 70A-N and length 72A-N each time scheduling module 34 adds an incoming packet 50 to the corresponding priority queue 62A-N. Similarly, selection module 36 can recalculate count 70A-N and length 72A-N each time selection module 36 removes a packet from the corresponding priority queue 62A-N. Alternatively, each priority queue 62A-N can include independent functionality that recalculates count 70A-N and length 72A-N each time a packet is added/removed from the priority queue 62A-N.

In any event, count 70A-N can comprise a number of packets currently on priority queue 62A-N. Similarly, length 72A-N can comprise a sum of the packet sizes for the packet (s) currently on priority queue 62A-N. In an embodiment of the invention, selection module 36 considers the priority corresponding to each priority queue 62A-N in identifying the alternative priority queue 62A-N. For example, counts 70A-N and/or lengths 72A-N can comprise weighted sums based on a priority of the corresponding priority queue 62A-N. Alternatively, selection module 36 can apply the weight to the count 70A-N and/or length 72A-N for each priority queue 62A-N when identifying the alternative priority queue 62A-N. In either case, use of weighted values will increase a likelihood that selection module 36 will select a higher priority queue 62A-N as an alternative priority queue 62A-N rather than a lower priority queue 62A-N. To this extent, selection module 36 can only use the relative weights of priority queues 62A-N to break a tie between two or more priority queues 62A-N (e.g., having the same count 70A-N).

Regardless, after selecting a packet from a priority queue 62A-N, selection module 36 can place the packet on a service queue 64. Servicing module 38 removes a packet from service queue 64 and processes the packet. By processing the packet, servicing module 38 may generate an outgoing packet 52. For example, outgoing packet 52 may be the same as the corresponding incoming packet 50, which computer system 12 (FIG. 1) communicates for processing by another computer system. Alternatively, outgoing packet 52 could comprise a different packet from the corresponding incoming packet 50, e.g., a response to receipt and/or processing of incoming packet 50, a slightly modified incoming packet 50 (e.g., a different destination address), and/or the like. Still further, it is understood that servicing module 38 may not generate any outgoing packet 52 as a result of processing incoming packet 50.

Figure 5A:
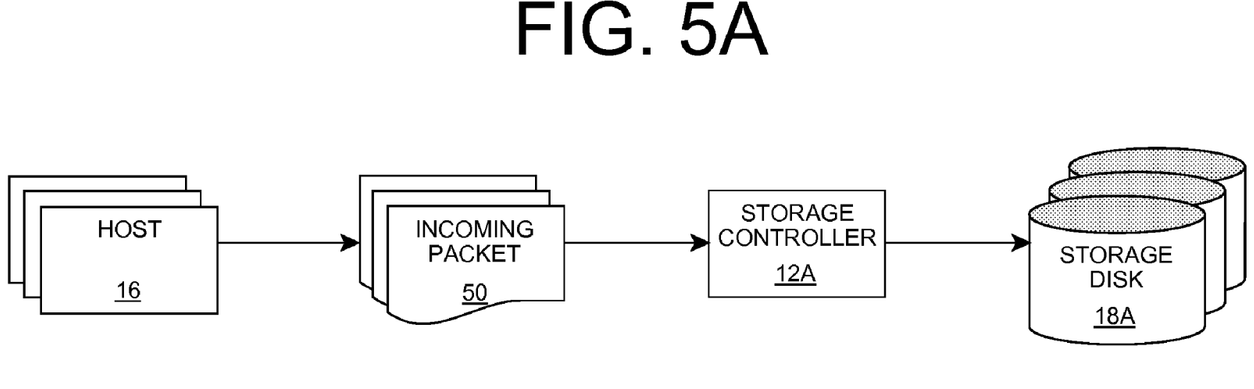
FIGS. 5A-B each show an illustrative environment in which the computer system shown in FIG. 1 can be implemented according to embodiments of the invention.

To this extent, computer system 12 (FIG. 1) can be implemented in various packetized communications environments. For example, FIGS. 5A-B each show an illustrative environment in which computer system 12 can be implemented according to embodiments of the invention. In FIG. 5A, computer system 12 comprises a storage controller 12A in a storage network, such as a Storage Area Network (SAN). In particular, a set of hosts 16 each send incoming packets 50, which include storage requests to store and/or access data on storage disks 18A. In this case, storage controller 12A can prioritize incoming packets 50 based on the type of request (e.g., using a logical unit number (LUN) field) and/or identifier for host 16, an Internet Protocol (IP) address, a virtual Local Area Network (VLAN) address, and/or the like. Regardless, storage controller 12A can communicate using any packetized communications technology, such as Small Computer System Interface (SCSI), Internet SCSI (iSCSI), Serial Advanced Technology Attachment (SATA), serial attached SCSI (SAS), Fiber Channel, Ethernet, and/or the like.

Figure 5B:
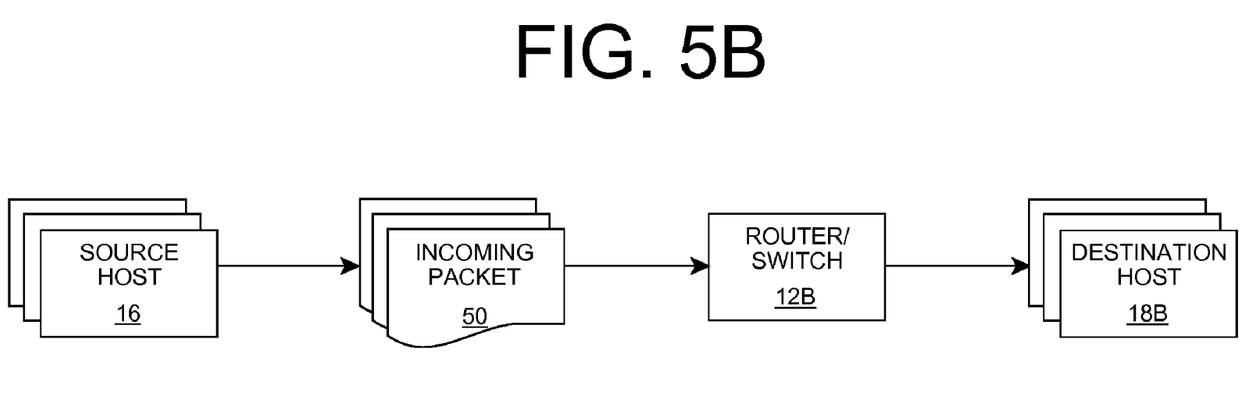

Similarly, in FIG. 5B, computer system 12 comprises a router/switch 12B in a packetized communications network, such as a Local Area Network (LAN). In particular, a set of source hosts 16 communicate incoming packets 50, which are received by router/switch 12B and forwarded for processing by destination hosts 18B. It is understood that any particular computing system in the communications network may comprise both a source host 16 and a destination host 18B. In this case, router/switch 12B can prioritize incoming packets 50 based on the content of incoming packets (e.g., streaming video versus e-mail), IP address, VLAN address, media access control (MAC) address, and/or the like, for forwarding to destination hosts 18B. Still further, it is understood that computer system 12 could comprise a host 16 in a communications network in which a host 16 processes and/or forwards packets 50.

While shown and described herein as a method and system for processing packets, it is understood that the invention further provides various alternative embodiments. For example, in one embodiment, the invention provides a computer program stored on a computer-readable medium, which when executed, enables a computer system to process packets. To this extent, the computer-readable medium includes program code, such as processing program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for processing packets. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that performs the process described herein on a subscription, advertising, and/or fee basis. That is, a service provider could offer to process packets in a packetized network as described herein. In this case, the service provider can manage (e.g., create, maintain, support, etc.) a computer system, such as computer system 12 (FIG. 1), that performs the process described herein for one or more customers. In return, the service provider can receive payment from the customer(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of processing packets, the method comprising:
   selecting a next packet from one of a plurality of queues for storing packets using a computer device, the selecting including:
      obtaining a search key, the search key comprising at least one of a random or a pseudo-random value; and
      identifying one of the plurality of queues based on the search key and a Patricia tree that includes at least one child node for each of the plurality of queues, wherein the Patricia tree implements a relative weight for each of the plurality of queues.

2. The method of claim 1, further including:
   removing the next packet from the identified one of the plurality of queues; and
   scheduling the next packet for processing.

3. The method of claim 1, the selecting further including:
   determining that the identified one of the plurality of queues is empty; and
   identifying an alternative one of the plurality of queues based on at least one property of the plurality of queues.

4. The method of claim 3, the at least one property comprising at least one of: a number of packets in each of the plurality of queues or a length of packets in each of the plurality of queues.

5. The method of claim 3, the identifying the alternative being further based on at least one of: a controller bandwidth or a link bandwidth.

6. The method of claim 1, further comprising storing an incoming packet in one of the plurality of queues based on a priority for the incoming packet.

7. The method of claim 1, further comprising processing the selected next packet.

8. A system for processing packets, the system comprising:
   a computing device including:
   a selecting system for selecting a next packet from one of a plurality of queues for storing packets, the system for selecting including:
      an obtaining system for obtaining a search key, the search key comprising at least one of a random or a pseudo-random value; and
      a first identifying system for identifying one of the plurality of queues based on the search key and a Patricia tree that includes at least one child node for each of the plurality of queues, wherein the Patricia tree implements a relative weight for each of the plurality of queues.

9. The system of claim 8, further including:
   a removing system for removing the next packet from the identified one of the plurality of queues; and
   a scheduling system for scheduling the next packet for processing.

10. The system of claim 8, the system for selecting further including:
    a determining system for determining that the identified one of the plurality of queues is empty; and
    a second identifying system for identifying an alternative one of the plurality of queues based on at least one property of the plurality of queues.

11. The system of claim 8, further comprising a storing system for storing an incoming packet in one of the plurality of queues based on a priority for the incoming packet.

12. The system of claim 8, further comprising a next packet processing system for processing the selected next packet.

13. The system of claim 8, wherein the packets comprise storage requests in a storage network.

14. A computer program comprising program code stored on a non-transitory computer readable storage medium which when executed by a computer system performs the following steps:
    selecting a next packet from one of a plurality of queues for storing packets, the selecting including:
       obtaining a search key, the search key comprising at least one of a random or a pseudo-random value; and
       identifying one of the plurality of queues based on the search key and a Patricia tree that includes at least one child node for each of the plurality of queues, wherein the Patricia tree implements a relative weight for each of the plurality of queues.

15. The computer program of claim 14, the method further including:
    removing the next packet from the identified one of the plurality of queues; and
    scheduling the next packet for processing.

16. The computer program of claim 14, the selecting further including:

determining that the identified one of the plurality of queues is empty; and identifying an alternative one of the plurality of queues based on at least one property of the plurality of queues.

17. The computer program of claim 16, the at least one property comprising at least one of: a number of packets in each of the plurality of queues or a length of packets in each of the plurality of queues.

18. The computer program of claim 14, the method further comprising storing an incoming packet in one of the plurality of queues based on a priority for the incoming packet.

19. The computer program of claim 14, the method further comprising processing the selected next packet.

20. A method of generating a system for processing packets, the method comprising:

providing a computer system configured to:
  select a next packet from one of a plurality of queues for storing packets, the selecting including:
    obtaining a search key, the search key comprising at least one of a random or a pseudo-random value; and
    identifying one of the plurality of queues based on the search key and a Patricia tree that includes at least one child node for each of the plurality of queues, wherein the Patricia tree implements a relative weight for each of the plurality of queues.

* * * * *